United States Patent
Kim

(10) Patent No.: US 12,106,091 B2
(45) Date of Patent: Oct. 1, 2024

(54) OTA UPDATE APPARATUS AND METHOD THEREOF

(71) Applicants: Hyundai Motor Company, Seoul (KR); Kia Corporation, Seoul (KR)

(72) Inventor: Dong Hwan Kim, Yongin-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 46 days.

(21) Appl. No.: 18/079,587

(22) Filed: Dec. 12, 2022

(65) Prior Publication Data

US 2024/0045663 A1 Feb. 8, 2024

(30) Foreign Application Priority Data

Aug. 2, 2022 (KR) .................. 10-2022-0096212

(51) Int. Cl.
*G06F 8/65* (2018.01)
*B60R 16/02* (2006.01)
*G06F 11/30* (2006.01)
*H04W 4/44* (2018.01)

(52) U.S. Cl.
CPC ............ *G06F 8/65* (2013.01); *G06F 11/3058* (2013.01); *H04W 4/44* (2018.02); *B60R 16/02* (2013.01)

(58) Field of Classification Search
CPC ....... G06F 8/60–66; H04W 4/44; B60R 16/02
USPC .................................................. 717/168–178
See application file for complete search history.

(56) References Cited

U.S. PATENT DOCUMENTS

2018/0203683 A1* 7/2018 Kim .................... G06F 8/65

FOREIGN PATENT DOCUMENTS

WO WO-2019035259 A1 * 2/2019 ............. B60R 16/02

OTHER PUBLICATIONS

Andrade, Carlos, et al., Managing Massive Firmware-Over-The-Air Updates for Connected Cars in Cellular Networks, Proc of the 2nd ACM International Workshop on Smart, Autonomous, and Connected Vehicular Systems and Services, 2017, 8 pages, [retrieved on Mar. 20, 2024], Retrieved from the Internet: <URL:http://dl.acm.org>.*

* cited by examiner

*Primary Examiner* — Geoffrey R St Leger
(74) *Attorney, Agent, or Firm* — Fish & Richardson P.C.

(57) ABSTRACT

An over-the-air (OTA) update apparatus includes a communication device that receives data for an OTA update of software for vehicle from a server and a processor that calculates an expected update current consumed by a controller loaded into a vehicle in an additional OTA update proceeding subsequently, based on current consumption consumed in an OTA update of the controller, determines an update factor to be proportional to the expected update current, and proceeds with the additional OTA update based on that the update factor is less than or equal to a predetermined threshold.

20 Claims, 9 Drawing Sheets

OTA UPDATE APPARATUS AND METHOD THEREOF

CROSS-REFERENCE TO RELATED APPLICATION

This application claims the benefit of priority to Korean Patent Application No. 10-2022-0096212, filed in the Korean Intellectual Property Office on Aug. 2, 2022, the entire contents of which are incorporated herein by reference.

TECHNICAL FIELD

The present disclosure relates to an over-the-air (OTA) update apparatus and a method thereof, and more particularly, relates to an OTA update apparatus of a vehicle and a method thereof.

BACKGROUND

With the development of intelligent transportation system (ITS) and the increase in vehicle capable of performing wireless communication (e.g., wireless-fidelity (Wi-Fi), third generation (3G), long term evolution (LTE), fifth generation (5G), new radio (NR) system), communication between a vehicle and another vehicle or between a vehicle and an external infrastructure has been gradually developed in the form of various services. Furthermore, the number of electronic control units (ECUs) in the vehicle is increasing day by day by service requirements of consumers and added functions. As the structure and the function of such an ECU become more diverse and complex, a software module for the ECU is more frequently required to update software in the vehicle due to bug fix, performance improvement, security improvement, or the like.

The use of an OTA update scheme is expanded for a software update in the vehicle. When the OTA update proceeds after the vehicle is turned off, battery discharge occurs when the battery drains a lot during the update process. Thus, a phenomenon where the vehicle is not turned on after an update may occur.

Thus, there is a need for a method to prevent the battery from being discharged and more efficiently proceed with an update.

SUMMARY

The present disclosure has been made to solve the above-mentioned problems occurring in the conventional OTA apparatus while advantages achieved by the conventional OTA apparatus are maintained intact.

An aspect of the present disclosure provides an OTA update apparatus for preventing a battery of a vehicle from being discharged in an OTA update process and a method thereof.

Another aspect of the present disclosure provides an OTA update apparatus for more accurately calculating an update factor for determining whether to enter an OTA update and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an over-the-air (OTA) update apparatus may include a communication device that receives data for an OTA update of software for vehicle from a server and a processor that calculates an expected update current consumed by a controller loaded into a vehicle in an additional OTA update proceeding subsequently, based on current consumption consumed in an OTA update of the controller, determines an update factor to be proportional to the expected update current, and proceeds with the additional OTA update based on that the update factor is less than or equal to a predetermined threshold.

In some implementations, the processor may obtain unit current consumption consumed by the controller in units of a certain time within an OTA update duration, may obtain an average value of the unit current consumption, and may calculate representative current consumption during the OTA update duration once to determine the update factor.

In some implementations, the processor may calculate an average value of the representative current consumption for each of a plurality of OTA update durations and may determine the update factor to be proportional to the average value of the representative current consumption.

In some implementations, the processor may assign a weight to representative current consumption for the latest OTA update duration among the plurality of OTA update durations to determine the update factor.

In some implementations, the processor may determine noise based on a magnitude of the representative current consumption according to a battery temperature and may remove the noise in a process of determining the update factor.

In some implementations, the processor may determine noise based on a magnitude of the representative current consumption according to a magnitude of update data and may remove the noise in a process of determining the update factor.

In some implementations, the processor may calculate a time taken to proceed with the OTA update and may determine the update factor to be proportional to the time taken.

In some implementations, the processor may calculate an average of times taken to proceed with the OTA update during each of a plurality of OTA update durations to obtain an expected update time and may determine the update factor to be proportional to the expected update time.

In some implementations, the processor may determine the expected update current, based on a larger value between a representative current value of a first controller or a representative current value of a second controller, when the first controller and the second controller are updated in parallel.

In some implementations, the processor may calculate a larger value between a time taken to proceed with an update of a first controller or a time taken to proceed with an update of a second controller as an expected update time, when the first controller and the second controller are updated in parallel, and may determine the update factor to be proportional to the expected update time.

According to another aspect of the present disclosure, an over-the-air (OTA) update method may include calculating an expected update current consumed by a controller loaded into a vehicle in an additional OTA update proceeding subsequently, based on current consumption consumed in an OTA update of the controller, determining an update factor to be proportional to the expected update current, and proceeding with the additional OTA update, based on that the update factor is less than or equal to a predetermined threshold.

In some implementations, the calculating of the expected update current may include obtaining unit current consumption consumed by the controller in units of a certain time, within an OTA update duration, and obtaining an average value of the unit current consumption and calculating representative current consumption during the OTA update duration once.

In some implementations, the determining of the update factor may include calculating an average value of the representative current consumption for each of the plurality of OTA update durations and determining the update factor to be proportional to the average value of the representative current consumption.

In some implementations, the determining of the update factor may further include assigning a weight to representative current consumption for the latest OTA update duration among the plurality of OTA update durations.

In some implementations, the determining of the update factor may further include determining noise based on a magnitude of the representative current consumption according to a battery temperature.

In some implementations, the determining of the update factor may further include determining noise based on a magnitude of the representative current consumption according to a magnitude of update data.

In some implementations, the determining of the update factor may further include calculating a time taken to proceed with the OTA update and determining the update factor to be proportional to the time taken.

In some implementations, the determining of the update factor may include calculating an average of times taken to proceed with the OTA update during each of a plurality of OTA update durations to obtain an expected update time and determining the update factor to be proportional to the expected update time.

In some implementations, the calculating of the expected update current may include determining the expected update current, based on a larger value between a representative current value of a first controller or a representative current value of a second controller, when the first controller and the second controller are updated in parallel.

In some implementations, the determining of the update factor may include calculating a larger value between a time taken to proceed with an update of a first controller or a time taken to proceed with an update of a second controller as an expected time taken, when the first controller and the second controller are updated in parallel, and determining the update factor to be proportional to the expected time taken.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
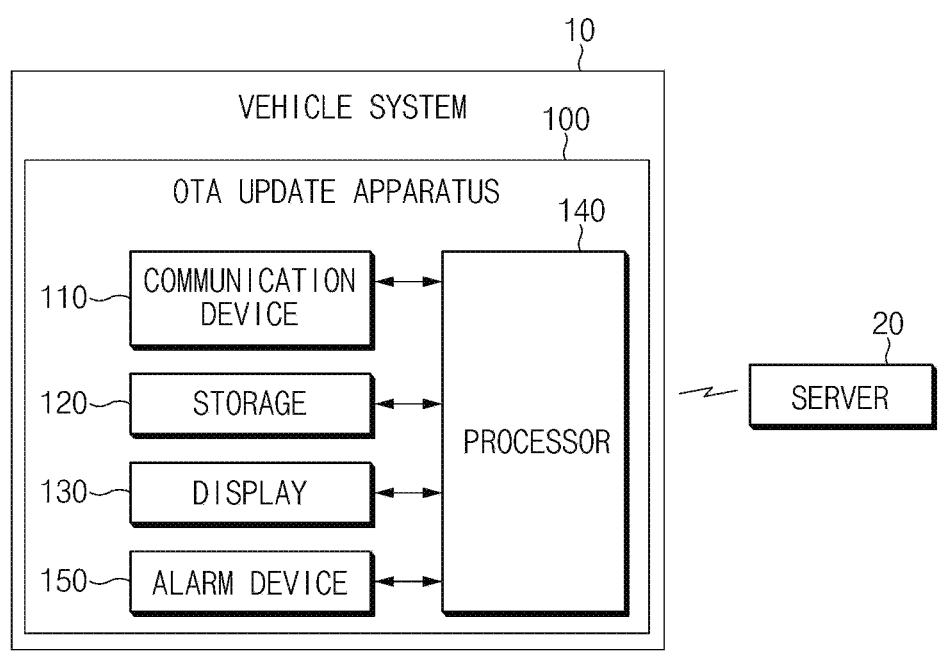
FIG. 1 is a block diagram illustrating an example of a vehicle system including an OTA update apparatus of a vehicle.

FIG. 1 is a block diagram illustrating an example of a vehicle system 10 including an OTA update apparatus of a vehicle.

Referring to FIG. 1, an OTA update apparatus 100 of a vehicle may perform background transmission of data for an OTA update of software of the vehicle from a server 20 outside the vehicle.

To perform a wireless update called an OTA update, the OTA update apparatus 100 may calculate expected current consumption and an expected update time for each controller and may determine whether to enter the OTA update based on the expected current consumption and the expected update time.

After succeeding in performing the OTA update, the OTA update apparatus 100 may read a software version, may identify normal reprogramming completion, and may notify a user of it to provide the user with it.

In some implementations, the present disclosure may be applied to an autonomous driving service, a remote vehicle control service, an interactive service, such as a game, a mass short-range audio/video service, such as augmented reality (AR) or virtual reality (VR). Furthermore, in some implementations, the present disclosure may be applied to an update on infotainment software or map information of the vehicle. Furthermore, in some implementations, the present disclosure may be applied to a service such as server-based speech recognition, smart watch interworking, or home-to-car. The home-to-car service may include, for example, a home lighting control function, an air conditioning control function, a plug control function for laundry room, living room, master room, or the like, or the like by means of a communication electronic control unit (ECU) in the vehicle. Alternatively, there may be a vehicle diagnosis control service. In some implementations, the present disclosure may provide a service of identifying a position of a surrounding garage to share vehicle information and making a maintenance reservation to a place selected by a user. To this end, the present disclosure may provide vehicle information to more garages such that the garages know more information for the vehicle to plan a reservation of a maintenance visit. As an example, the present disclosure may transmit maintenance requirements, a time elapsed after last maintenance, function state information, vehicle diagnosis information, or the like, which is information when the vehicle is lastly traveling or the like as the vehicle information.

To this end, the OTA update apparatus 100 of the vehicle may include a communication device 110, storage 120, a display 130, a processor 140, and an alarm device 150.

The communication device 110 may be a hardware device implemented with various electronic circuits to transmit and receive a signal through a wireless or wired connection. The communication device 110 may perform inter-vehicle communication through controller area network (CAN) communication, local interconnect network (LIN) communication, Ethernet communication, or the like and may include various communication units, for example, a mobile communication unit, a broadcast receiving unit, such as a digital multimedia broadcasting (DMB) module or a digital video broadcasting-handheld (DVB-H) module, a short-range communication unit, such as a ZigBee module or a near field communication (NFC) module which is a Bluetooth module, and a wireless-fidelity (Wi-Fi) communication unit to communicate with the server 20 outside the vehicle. The CAN communication may be a network system for vehicle, which is developed to provide digital serial communication between various instrumentation and control equipment in the vehicle. The CAN-data bus may be used for data transmission and control between electronic control units (ECUs).

The communication device 110 may be loaded into the vehicle, or the communication device 110 may be configured in a form where a wireless communication terminal comes into contact with the communication device 110. As a result, the communication device 110 may perform vehicle-to-vehicle (V2V) communication and vehicle-to-infrastructure (V2I) communication, and may perform autonomous driving to a predetermined destination by means of a vehicle sensor and a driving control function, which are provided in the vehicle. The vehicle sensor may include at least one of a global positioning system (GPS) sensor, a gyro sensor, or an acceleration sensor.

Furthermore, the communication device 110 may support a wireless access in vehicular environment (WAVE) communication technology or may support a communication technology of a long term evolution/new radio (LTE/NR) system based on 3rd generation partnership project (3GPP). For reference, WAVE communication is a technology of modifying IEEE 802.11a WLAN technology, which has features of using a dedicated band of 5.9 GHz, having a channel frequency bandwidth of 10 MHz, and having a maximum data rate of 27 Mbps, has a feature where wireless channel access is a carrier sense multiple access with collision avoidance (CSMA/CA) scheme, and has a feature of consisting of IEEE 802.11p physical layer and 1609 communication stacks. Meanwhile, when supporting a 3GPP system, the communication device 110 may include LTE eV2X and 5G V2X communication technologies, based on LTE V2X (Rel.14).

The vehicle may support vehicle-to-vehicle (V2V) communication referring to LTE/NR-based communication between vehicles, vehicle-to-pedestrian (V2P) communication referring to LTE/NR-based communication between a vehicle and a terminal carried by a person, and vehicle-to-infrastructure/network (V2I/N) communication referring to LTE/NR-based communication between a vehicle and a unit/network by the roadside.

Furthermore, there may be no limit to a multi-access technique of a wireless communication system. For example, various multi-access techniques such as code division multiple access (CDMA), time division multiple access (TDMA), frequency division multiple access (FDMA), orthogonal frequency division multiple access (OFDMA), single carrier-FDMA (SC-FDMA), OFDM-FDMA, OFDM-TDMA, and OFDM-CDMA may be used. Furthermore, a time division duplex (TDD) mode where data is transmitted in a different time or a frequency division duplex (FDD) mode where data is transmitted using a different frequency may be used for uplink transmission or downlink transmission.

The storage 120 may store data downloaded for a vehicle OTA update, which is received from the server 20 via the communication device 110. The storage 120 may store, manage, or update state/diagnosis information of the vehicle, location information of the vehicle, road information, information around the road, such as a bus stop, and information about a road environment, by means of vehicle sensors provided in the vehicle and the server 20. Furthermore, the storage 120 may store destination information set by the user, previously searched route information, or the like. Alternatively, the storage 120 may store or manage data for various input sensors for supporting autonomous driving and may store or manage data by means of a server which supports road information, communication information, and the like.

The storage 120 may store current consumption of a controller, which is identified in units of a certain time while an OTA update proceeds, and may store an OTA update time of the controller. The storage 120 may include at least one type of storage medium such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, or an optical disk.

The display 130 may be controlled by the processor 140 to display a screen for being granted user authentication for an OTA update of the vehicle. The display 130 may be implemented as a head-up display (HUD), a cluster, audio video navigation (AVN), or the like. Furthermore, the display 130 may include at least one of a liquid crystal display (LCD), a thin film transistor-LCD (TFT-LCD), a light emitting diode (LED) display, an organic LED (OLED) display, an active matrix OLED (AMOLED) display, a flexible display, a bended display, or a three-dimensional (3D) display. Some thereof may be implemented as transparent displays configured as a transparent type or a semi-transparent type to see the outside. Moreover, the display 130 may be implemented as a touchscreen including a touch panel to be used as an input device other than an output device. In some implementations, the display 130 may display reprogramming completion and version information to the user.

The processor 140 may be electrically connected with the communication device 110, the storage 120, the display 130, the alarm device 150, or the like and may electrically control the respective components. The processor 140 may be an electrical circuit which executes instructions of software and may perform a variety of data processing and calculation described below.

The processor 140 may control whether to perform an OTA update, with regard to a network load, a vehicle power state, a battery state, a time expected to transmit remaining ROM data, or the like. Particularly, the processor 140 may identify current consumption and an OTA update time of the controller during an OTA update duration and may determine whether to enter an additional OTA update based on them.

The processor 140 may be connected with an external device based on a GPS, a telematics communication system, a Bluetooth communication system, a USB communication system, a Wi-Fi communication system, a WAVE communication system, and an LTE/5G communication system to perform communication processing for an entertainment service, a firmware update, and remote start, eCall, and an autonomous driving service.

The processor 140 may include a default (general) function, a differential function, a memory duplex function, or a differential+ memory duplex function and may perform an OTA update for each set function.

When a screen for being granted from the user is displayed on the display 130, the alarm device 150 may output a notification for approval to the user.

Figure 2:
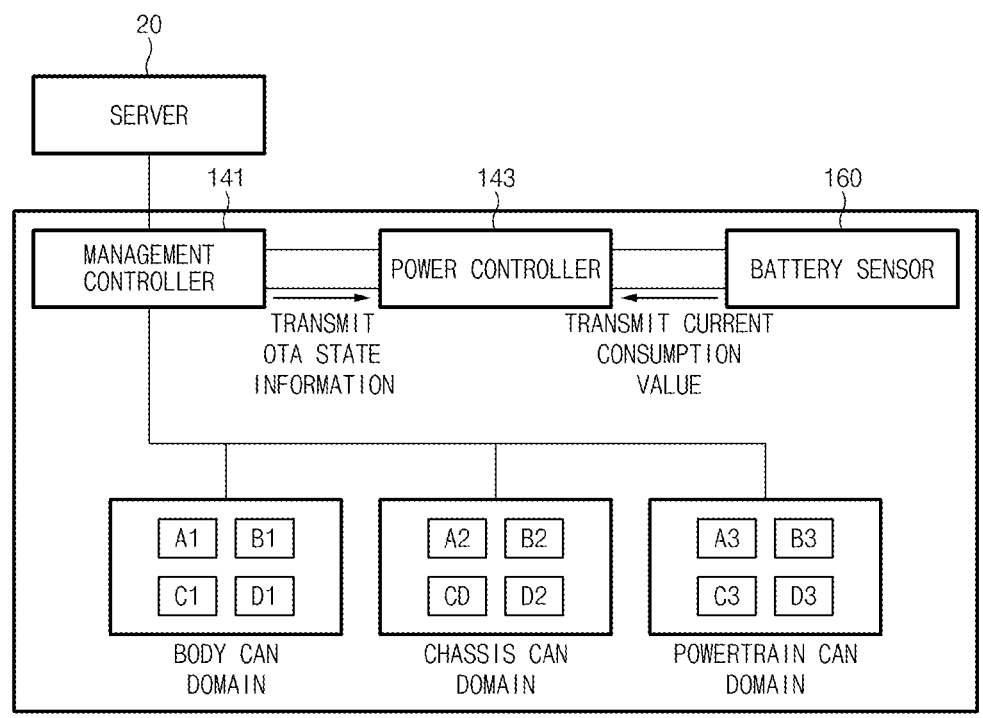
FIG. 2 is a drawing illustrating an example of an OTA update apparatus.

FIG. 2 is a drawing illustrating an example of an OTA update apparatus. FIG. 2 describes that a processor shown in FIG. 1 is implemented with a management controller and a power controller.

Referring to FIG. 2, the OTA update apparatus may include a management controller 141, a power controller 143, and a battery sensor 160.

The management controller 141 may manage an OTA update, may download firmware data from a server 20, and may transmit the firmware data to performance controllers to execute reprogramming. The management controller 141 may control to apply a default, a differential scheme, or a memory duplex scheme for reprogramming to perform an OTA update. The management controller 141 may control to determine a network load rate and a firmware load rate and perform an OTA update.

The management controller 141 may notify the power controller 143 that OTA updates of performance controllers are started and ended. Communication between the management controller 141 and the power controller 143 may be based on CAN communication.

The power controller 143 may obtain battery information and a time taken for an update, based on control of the management controller 141. The battery information may include current consumption of the battery while an OTA update of a battery state of charge (SOC) proceeds. The power controller 143 may determine whether to enter an additional OTA update, based on the battery information and the time taken for the update. In other words, the power controller 143 may determine whether to proceed with an nth-order OTA update based on battery information and a time taken for an update from a first-order OTA update to an (n−1)th-order (n is a natural number of 2 or more) OTA update.

The performance controllers may perform an update (or write) operation depending on an update request. The performance controllers may perform a default, a differential scheme, or memory duplex scheme and may include a memory which stores ROM data and updated data depending on a corresponding function.

FIG. 2 illustrates an implementation including a total of 12 performance controllers such as A1, B1, C1, D1, A2, B2, C2, D2, A3, B3, C3, and D3. In other words, the performance controllers may include controllers A1, B1, C1, and D1 which belong to a body CAN domain. Furthermore, the performance controllers may include controllers A2, B2, C2, and D2 which belong to a chassis CAN domain. Furthermore, the performance controllers may include controllers A3, B3, C3, and D3 which belong to a powertrain CAN domain.

The battery sensor 160 may sense a battery SOC and battery current consumption. The battery sensor 160 may provide the power controller 143 with the obtained battery SOC and the obtained battery current consumption.

Hereinafter, a description will be given of an OTA update method of a controller. Hereinafter, in the specification, the performance controller may be referred to as a controller.

Figure 3:
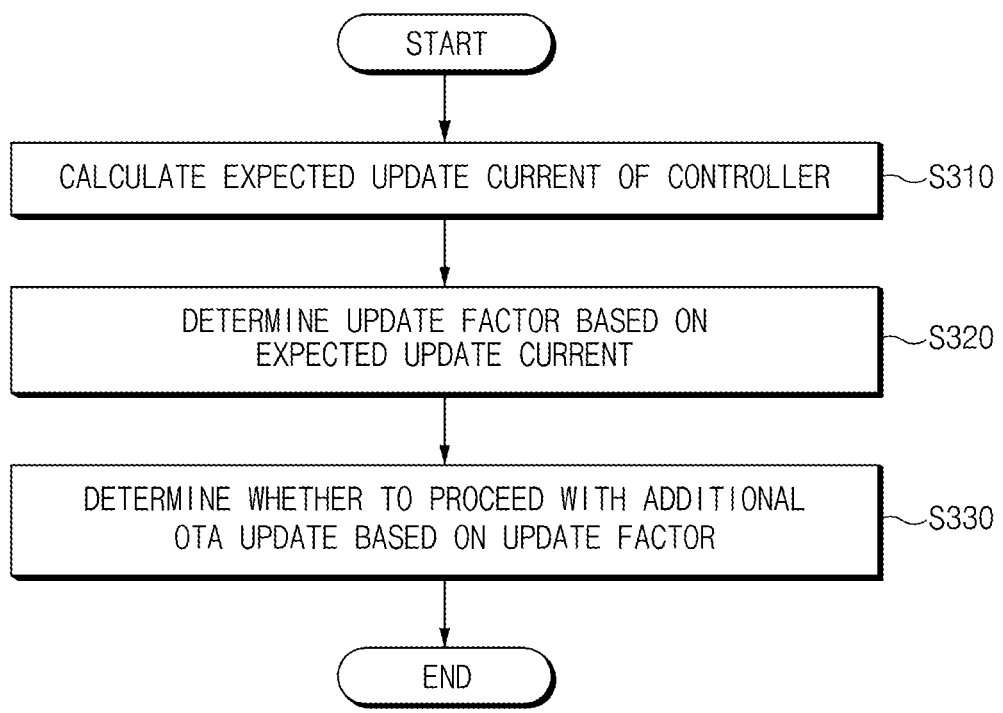
FIG. 3 is a flowchart describing an example of an OTA update method of a controller.

FIG. 3 is a flowchart describing an example of an OTA update method of a controller.

The OTA update method of the controller will be described with reference to FIG. 3.

In S310, a processor 140 of FIG. 1 may calculate an expected update current of the controller. The processor 140 may calculate an expected update current consumed by the controller in an additional OTA update, based on current consumption consumed in an OTA update of the controller.

In some implementations, the processor 140 may obtain unit current consumption consumed by the controller in units of a certain time and may calculate an average value of the unit current consumption as representative current consumption during an OTA update duration.

The processor 140 may calculate an expected update current during an nth-order OTA update duration, based on representative current consumption during an (n−1)th-order OTA update duration.

Alternatively, the processor 140 may calculate an expected update current during the nth-order OTA update duration, based on two or more representative current consumption in the representative current consumption from the first-order OTA update duration to the (n−1)th-order OTA update duration. To this end, the processor 140 may calculate an average value of the two or more representative current consumption in the representative current consumption from the first-order OTA update duration to the (n−1)th-order OTA update duration.

In S320, the processor 140 may determine an update factor based on the expected update current. The update factor may be a criterion of determining whether to proceed with an additional OTA update. The processor 140 may determine an update factor to be proportional to a magnitude of the expected update current.

Furthermore, the processor 140 may determine an update factor based on a time taken to proceed with an OTA update. For example, the processor 140 may determine an update factor to be proportional to a time taken for an OTA update.

Furthermore, the processor 140 may determine an update factor with regard to both the expected update current and the time taken for the OTA update.

In S330, the processor 140 may determine whether to proceed with an additional OTA update, based on the update factor. In some implementations, the processor 140 may proceed with the additional OTA update, based on that the update factor is less than or equal to a threshold. In other words, when the update factor is greater than the threshold, the processor 140 may fail to proceed with the additional OTA update.

Figure 4:
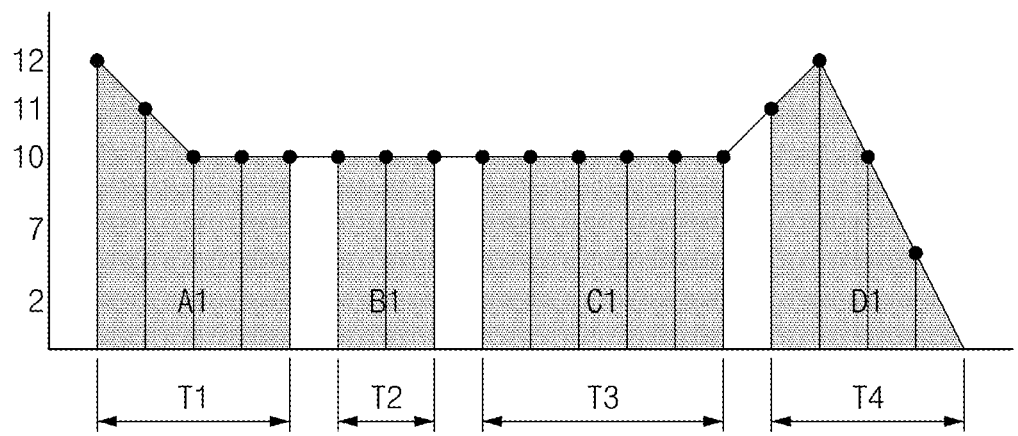
FIG. 4 is a drawing describing an example of a method for obtaining an expected update current and an update time.

FIG. 4 is a drawing describing an example of a method for obtaining an expected update current and an update time to determine an update factor. FIG. 4 is a drawing illustrating an update time and current consumption of each of controllers A1, B1, C1, and D1 which belong to a body CAN domain.

Referring to FIG. 4, a processor 140 of FIG. 1 may proceed with an update in an order of controller A1, controller B1, controller C1, and controller D1.

The processor 140 may identify a time taken for an update of each of controllers A1, B1, C1, and D1. The processor 140 may determine a timing when the transmission of an update ROM file is started as an update start timing. Furthermore, after the transmission of the ROM file is completed, the processor 140 may determine a timing when the software version of the ROM file is read as an update complete timing. The processor 140 may determine a time from the update start timing to the update complete timing as a time taken for an update.

A first duration T1 indicates a time taken for an update of controller A1. A second duration T2 indicates a time taken for an update of controller B1. A third duration T3 indicates a time taken for an update of controller C1. A fourth duration T4 indicates a time taken for an update of controller D1. The first to fourth durations T1 to T4 may refer to a time taken for one update.

To identify current consumption of controllers, the processor 140 may receive current consumption information through a battery sensor 160 of FIG. 2 in units of a certain duration.

FIG. 4 illustrates that controller A1 receives unit current consumption information five times during the first duration T1 and that controller B1 receives unit current consumption information three times during the second duration T2.

To obtain representative current consumption consumed by each of controllers during one OTA update, the processor 140 may average unit current consumption sampled in units of a certain duration. When the unit current consumption of controller A1 is 12, 11, 10, 10, or 10, the processor 140 may average unit current consumption to calculate representative current consumption as 10.6 (A).

Similarly, the processor 140 may average unit current consumption of each of controllers B1, C1, and D1 to calculate representative current consumption.

The processor 140 may store representative current consumption of each of the controllers and a time taken in each of the controllers in storage 120 of FIG. 1 to generate a memory map.

Table 1 below is a table illustrating an example of a memory map in which representative current consumption and a time taken are stored.

TABLE 1

|  |  | First - order OTA | Second - order OTA | Third - order OTA | Fourth - order OTA | Fifth - order OTA |
|---|---|---|---|---|---|---|
| Controller A1 | representative current consumption | 10.6 | | | | |
| | Time taken | 8 | | | | |
| Controller B1 | representative current consumption | 10 | | | | |
| | Time taken | 4 | | | | |
| Controller C1 | representative current consumption | 10 | | | | |
| | Time taken | 10 | | | | |
| Controller D1 | representative current consumption | 8.2 | | | | |
| | Time taken | 8 | | | | |

In Table 1 above, the unit of the representative current consumption may be ampere (A) and the unit of the time taken may be second (s).

Table 1 above indicates an example in which updates of controllers A1, B1, C1, and D1 proceed during one OTA update duration.

Thereafter, whenever an OTA update proceeds, the processor 140 may store representative current consumption of a controller, an update of which proceeds, and a time taken in the controller. Table 2 below is a table illustrating an example of a memory map from a first-order OTA update and a fifth-order OTA update.

TABLE 2

|  |  | First - order OTA | Second - order OTA | Third - order OTA | Fourth - order OTA | Fifth - order OTA |
|---|---|---|---|---|---|---|
| Controller A1 | representative current consumption | 10.6 | 11 | | | 10 |
| | Time taken | 8 | 6 | | | 7 |
| Controller B1 | representative current consumption | 10 | 10 | 12 | 14 | 15 |
| | Time taken | 4 | 6 | 8 | 8 | 9 |

TABLE 2-continued

|  |  | First-order OTA | Second-order OTA | Third-order OTA | Fourth-order OTA | Fifth-order OTA |
|---|---|---|---|---|---|---|
| Controller C1 | representative current consumption | 10 | 7 |  | 8 |  |
|  | Time taken | 10 |  |  | 9 |  |
| Controller D1 | representative current consumption | 8.2 |  | 10 | 11 | 10 |
|  | Time taken | 8 |  | 9 | 8 | 7 |

Table 2 above indicates an example in which updates of controllers A1, B1, and C1 proceed in a second-order update. Furthermore, the targets of the third-order update include controllers B1 and D1, the targets of the fourth-order update include controllers B1, C1, and D1, and the targets of the fifth-order update include controllers A1, B1, and D1.

The processor 140 may calculate an expected update current based on representative current consumption and a time taken, which are obtained during two or more OTA update durations. For example, the expected update current of controller A1 in the fifth-order OTA update may be set to 10.8 (A) corresponding to an average value of representative current consumption of 10.6 (A) in the first-order OTA update and representative current consumption of 11 (A) in the second-order OTA update. Furthermore, the expected update time of controller A1 in the fifth-order OTA update may be set to an average value 7 (s) of 8 (s) and 6 (s).

Similarly, the expected update current of controller B1 may be set to 12.2 (A), and the expected update time may be set to 7 (s). The expected update current of controller C1 may be set to 8.3 (A), and the expected update time may be set to 9 (s). The expected update current of controller D1 may be set to 9.8 (A), and the expected update time may be set to 8.2 (s).

The processor 140 may calculate an expected update current and an expected update time based on a predetermined number of updates. When configured to calculate an expected update current and an expected update time based on five updates, the processor 140 may delete the oldest information from the storage 120 as an update exceeding five times proceeds.

Figure 5:
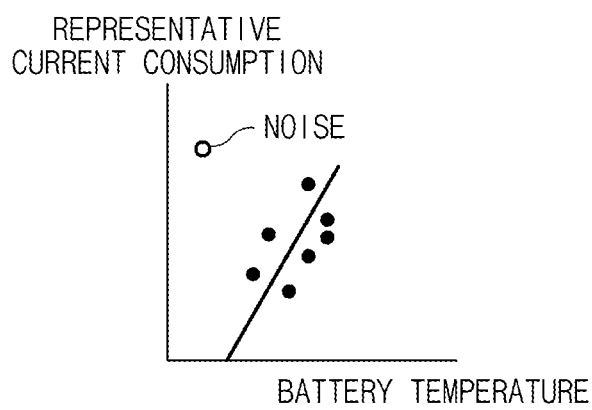
FIG. 5 is a drawing illustrating an example of determining noise based on representative current consumption according to a battery temperature.
Figure 6:
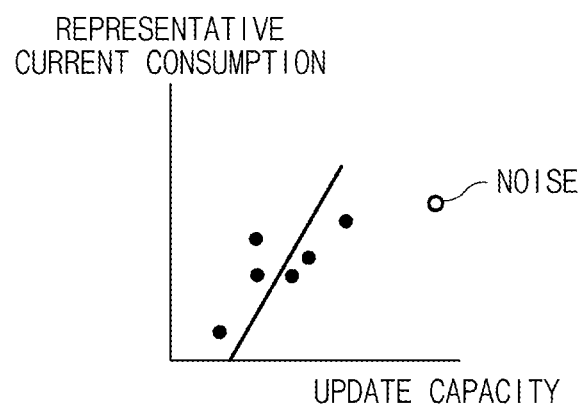
FIG. 6 is a drawing illustrating an example of determining noise based on representative current consumption according to an update capacity.

Furthermore, the processor 140 may assign a weight to representative current consumption and a time taken during a specific update duration. For example, when there is a request for an nth-order update, the processor 140 may assign a weight to representative current consumption of the latest (n−1)th-order update and may calculate an average value of the representative current consumption to which the weight is assigned and other representative current consumption to calculate an expected update current. Because the magnitude of the expected update current is able to become excessively large, when assigning a weight to one representative current consumption to calculate an average value, the processor 140 may multiply the other representative current consumption by a reciprocal number of the weight. In such a manner, the processor 140 may calculate a current value, which has no significant difference in an arithmetic mean value of the representative current consumption and is closer to representative consumption current consumed in the latest update duration, as an expected current value FIGS. 5 and 6 are drawings describing an example of determining a noise of representative current consumption. FIG. 5 is a drawing illustrating an example of determining noise based on representative current consumption according to a battery temperature. FIG. 6 is a drawing illustrating an example of determining noise based on representative current consumption according to an update capacity.

A processor 140 of FIG. 1 may receive battery temperature information other than battery current consumption from a battery sensor 160 of FIG. 2. Furthermore, the processor 140 may identify a capacity of an update ROM file transmitted from a server 20 of FIG. 1.

Referring to FIG. 5, the processor 140 may determine noise based on a magnitude of representative current consumption according to a battery temperature. To this end, the processor 140 may match the battery temperature with the representative current consumption. The processor 140 may calculate a magnitude of the representative current consumption according to the battery temperature. Because the battery current consumption has a close relationship with the battery temperature, a ratio between the battery temperature and the representative current consumption may be close to a certain constant. When the magnitude of the representative current consumption deviates from any battery temperature over a certain range, the processor 140 may regard representative current consumption matched with any battery temperature as noise.

In some implementations, the processor may remove the noise in a process of determining the update factor.

Referring to FIG. 6, the processor 140 may determine noise based on a magnitude of representative current consumption according to an update capacity. To this end, the processor 140 may match the update capacity with the representative current consumption. The processor 140 may calculate a magnitude of the representative current consumption according to the update capacity. Because the battery current consumption has a close relationship with the update capacity, a ratio between the update capacity and the representative current consumption may be close to a certain constant. When the magnitude of the representative current consumption deviates from any update capacity over a certain range, the processor 140 may regard representative current consumption matched with any update capacity as noise.

In some implementations, the processor 140 may remove the noise in a process of determining the update factor.

Figure 7:
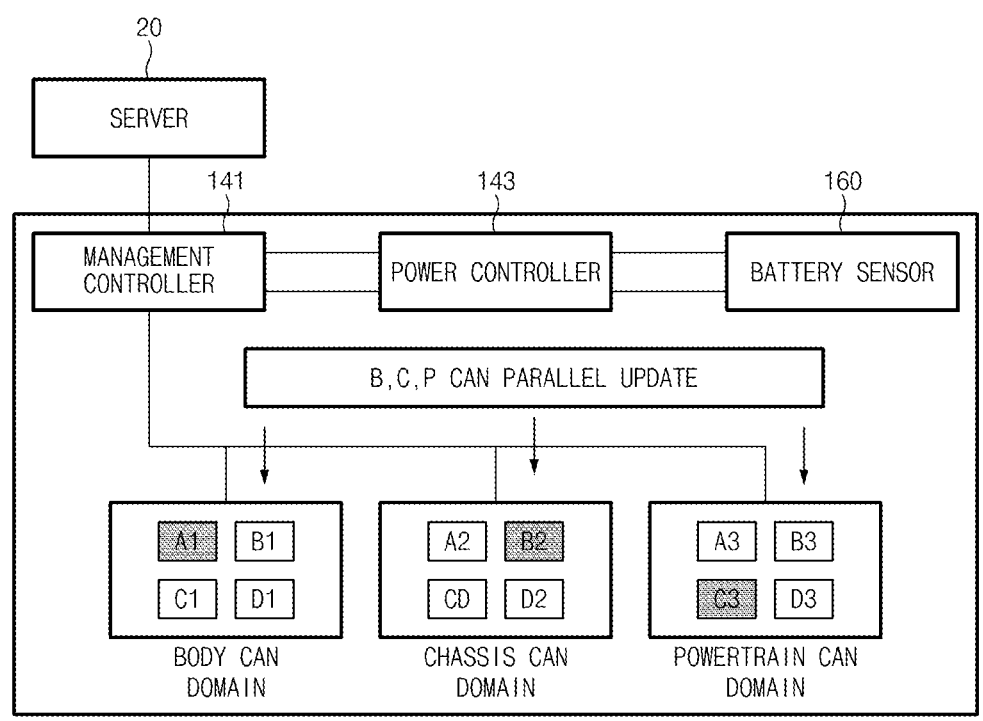
FIG. 7 is a drawing describing another example of an OTA update.

FIG. 7 is a diagram describing another example of an OTA update.

Referring to FIG. 7, the OTA update may use a parallel update scheme of simultaneously updating controllers which belong to a plurality of domains. In other words, controller A1 which belongs to a body CAN domain, controller B2 which belongs to a chassis CAN domain, and controller C3 which belongs to a powertrain CAN domain may be updated at the same time.

A processor 140 of FIG. 1 may store representative current consumption of each of the controllers and a time taken for an update of each of the controllers to generate a memory map like Table 3 below.

TABLE 3

|  | Controller A1 | Controller B2 | Controller C3 |
|---|---|---|---|
| representative current consumption | 10 | 8 | 14 |
| Time taken | 20 | 30 | 40 |

When controllers are updated in parallel, the processor 140 may determine a larger value in the representative current consumption of each of the controllers as an expected update current. The processor 140 may set an update factor based on the expected update current. For example, when the representative current consumption of controller C3 among controllers which are updated in parallel is largest as shown in Table 3 below, the processor 140 may determine an update factor based on the representative current consumption of controller C3.

Furthermore, when the controllers are updated in parallel, the processor 140 may determine a larger value among times taken in the controllers as a representative time taken. The processor 140 may determine an update factor based on the representative time taken. For example, when the representative time taken in controller C3 among the controllers which are updated in parallel is largest as shown in Table 3 above, the processor 140 may determine an update factor based on representative time taken in controller C3.

Figure 8:
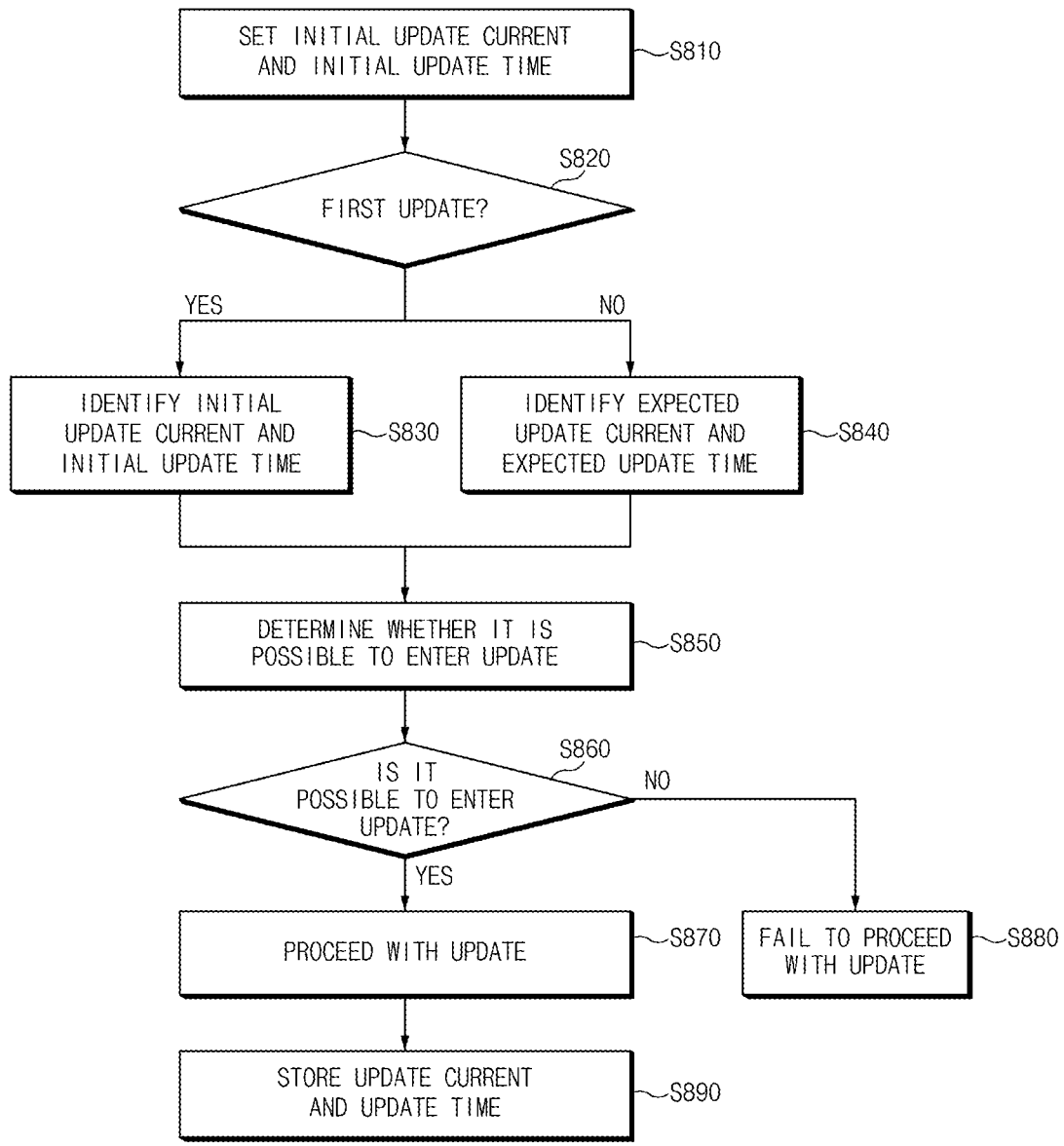
FIG. 8 is a flowchart describing another example of an OTA update method.

FIG. 8 is a flowchart describing another example of an OTA update method.

The OTA update method will be described with reference to FIG. 8.

In S810, a processor 140 of FIG. 1 may identify that an initial update current and an initial update time are set to determine whether to enter a first update. The initial update current and the initial update time may be set by a user and may be set to a sufficiently large value to prevent battery discharge from occurring in the update process.

When receiving update data from a server 20 of FIG. 1, in S820, the processor 140 may determine whether there is a first update.

When there is the first update, in S830, the processor 140 may identify the initial update current and the initial update time.

When there is no first update, in S840, the processor 140 may identify an expected update current and an expected update time. The expected update current and the expected update time may be obtained by the implementation described based on FIGS. 3 to 7.

In S850 and S860, the processor 140 may determine an update factor based on the initial update current and the initial update time. The update factor may be determined to be proportional to the initial update current and the initial update time.

Alternatively, the processor 140 may determine an update factor based on the expected update current and the expected update time. The update factor may be determined to be proportional to the expected update current and the expected update time.

The processor 140 may determine whether to proceed with an update, based on the update factor.

In S870, the processor 140 may proceed with an update, based on that the update factor is less than or equal to a predetermined threshold.

When the update factor is greater than the predetermined threshold, in S880, the processor 140 may fail to proceed with an update.

When the update proceeds, in S890, the processor 140 may store the update current and the update time.

Figure 9:
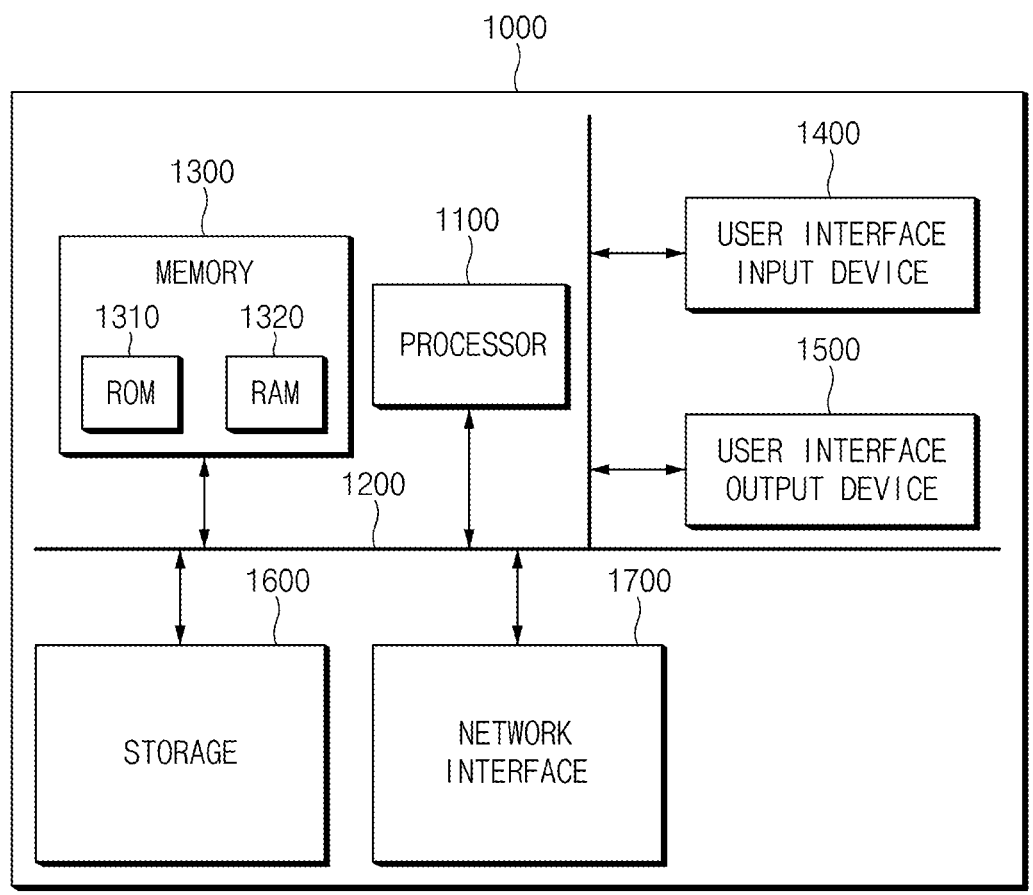
FIG. 9 is a block diagram illustrating an example of a computing system.

FIG. 9 is a block diagram illustrating an example of a computing system.

Referring to FIG. 9, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Thus, the operations of the method or the algorithm described in connection with the implementations disclosed herein may be implemented directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disc, a removable disk, and a CD-ROM.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

In some implementations, the OTA update apparatus may prevent a battery from being discharged in an update process by determining whether to proceed with an OTA update based on a current of the battery, which is consumed by an update in an OTA update process of the vehicle.

In some implementations, the OTA update apparatus may more accurately predict battery current consumption for an OTA update by determining an update factor based on a battery current actually consumed to determine whether to enter an OTA update, thus determining whether to enter the OTA update based on it.

In addition, various effects ascertained directly or indirectly through the present disclosure may be provided.

What is claimed is:

1. An over-the-air (OTA) update apparatus, comprising:
 a communication device configured to receive, from a server, data for an OTA update of a vehicle; and
 a processor configured to:
  calculate an expected update current to be consumed by a controller implemented in the vehicle for performing an additional OTA update, based on current consumption consumed in an OTA update of the controller,
  determine an update factor to be proportional to the expected update current, and
  performing, based on the determined update factor being less than or equal to a predetermined threshold, the additional OTA update.

2. The OTA update apparatus of claim 1, wherein the processor is configured to:
obtain unit current consumption consumed by the controller in units of preset time within an OTA update duration,
obtain an average value of the unit current consumption, and
calculate representative current consumption during the OTA update duration to determine the update factor.

3. The OTA update apparatus of claim 2, wherein the processor is configured to:
calculate an average value of the representative current consumption for each of a plurality of OTA update durations, and
determine the update factor to be proportional to the average value of the representative current consumption.

4. The OTA update apparatus of claim 3, wherein the processor is configured to assign a weight to representative current consumption for a latest OTA update duration among the plurality of OTA update durations to determine the update factor.

5. The OTA update apparatus of claim 2, wherein the processor is configured to
determine noise based on a magnitude of the representative current consumption according to a battery temperature, and
remove the noise in a process of determining the update factor.

6. The OTA update apparatus of claim 2, wherein the processor is configured to:
determine noise based on a magnitude of the representative current consumption according to a magnitude of update data, and
remove the noise in a process of determining the update factor.

7. The OTA update apparatus of claim 1, wherein the processor is configured to:
calculate a time taken to perform the OTA update, and
determine the update factor to be proportional to the calculated time.

8. The OTA update apparatus of claim 1, wherein the processor is configured to:
calculate an average of time taken to perform the OTA update during each of a plurality of OTA update durations to obtain an expected update time, and
determine the update factor to be proportional to the expected update time.

9. The OTA update apparatus of claim 1, wherein the processor is configured to, based on a first controller and a second controller implemented in the vehicle being updated in parallel, determine a greater value between a representative current value of a first controller and a representative current value of a second controller, as the expected update current.

10. The OTA update apparatus of claim 1, wherein the processor is configured to:
determine, based on a first controller and a second controller implemented in the vehicle being updated in parallel, a greater value between a time taken to perform an update of a first controller and a time taken to perform an update of a second controller, as an expected update time, and
determine the update factor to be proportional to the expected update time.

11. An over-the-air (OTA) update method, comprising:
calculating an expected update current to be consumed by a controller implemented in a vehicle for performing an additional OTA update, based on current consumption consumed in an OTA update of the controller;
determining an update factor to be proportional to the calculated expected update current; and
performing, based on the update factor being less than or equal to a predetermined threshold, the additional OTA update.

12. The OTA update method of claim 11, wherein calculating the expected update current includes:
obtaining unit current consumption consumed by the controller in units of preset time within an OTA update duration,
obtaining an average value of the unit current consumption, and
calculating representative current consumption during the OTA update duration.

13. The OTA update method of claim 12, wherein determining the update factor includes:
calculating an average value of the representative current consumption for each of a plurality of OTA update durations, and
determining the update factor to be proportional to the average value of the representative current consumption.

14. The OTA update method of claim 13, wherein determining the update factor includes:
assigning a weight to representative current consumption for a latest OTA update duration among the plurality of OTA update durations.

15. The OTA update method of claim 12, wherein determining the update factor includes:
determining noise based on a magnitude of the representative current consumption according to a battery temperature.

16. The OTA update method of claim 12, wherein determining the update factor includes:
determining noise based on a magnitude of the representative current consumption according to a magnitude of update data.

17. The OTA update method of claim 11, wherein determining the update factor includes:
calculating a time taken to perform the OTA update, and
determining the update factor to be proportional to the calculated time.

18. The OTA update method of claim 11, wherein determining the update factor includes:
calculating an average of times taken to perform the OTA update during each of a plurality of OTA update durations to obtain an expected update time, and
determining the update factor to be proportional to the expected update time.

19. The OTA update method of claim 11, wherein calculating the expected update current includes:
determining, based on a first controller and a second controller implemented in the vehicle being updated in parallel, a greater value between a representative current value of a first controller and a representative current value of a second controller, as the expected update current.

20. The OTA update method of claim 11, wherein the determining of the update factor includes:
determining, based on a first controller and a second controller implemented in the vehicle being updated in parallel, a greater value between a time taken to perform an update of a first controller and a time taken to perform an update of a second controller, as an expected time taken, and determining the update factor to be proportional to the expected time taken.

* * * * *